(12) United States Patent
Singh et al.

(10) Patent No.: US 11,267,329 B2
(45) Date of Patent: Mar. 8, 2022

(54) POWER SYSTEM FOR HYBRID VEHICLE

(71) Applicants: NINGBO UMD AUTOMATIC TRANSMISSION CO., LTD, Ningbo (CN); ZHEJIANG GEELY HOLDING GROUP CO., LTD, Hangzhou (CN)

(72) Inventors: Tejinder Singh, Ningbo (CN); Zhiling Qiu, Ningbo (CN); Weiqian Xie, Ningbo (CN); Jun Fu, Ningbo (CN)

(73) Assignees: NINGBO UMD AUTOMATIC TRANSMISSION CO., LTD, Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 0 days.

(21) Appl. No.: 17/177,166

(22) Filed: Feb. 16, 2021

(65) Prior Publication Data

US 2021/0178889 A1 Jun. 17, 2021

Related U.S. Application Data

(63) Continuation-in-part of application No. PCT/CN2019/078178, filed on Mar. 14, 2019.

(30) Foreign Application Priority Data

Aug. 17, 2018 (CN) .......................... 201810943518.7

(51) Int. Cl.
*B60K 6/365* (2007.10)
*B60K 6/445* (2007.10)

(52) U.S. Cl.
CPC .............. *B60K 6/365* (2013.01); *B60K 6/445* (2013.01)

(58) Field of Classification Search
None
See application file for complete search history.

(56) References Cited

U.S. PATENT DOCUMENTS 7,927,244 B2 * 4/2011 Iwanaka ............... B60W 20/20
475/5
9,114,699 B2 * 8/2015 Takei ...................... B60K 6/48
(Continued)

FOREIGN PATENT DOCUMENTS

CN 104908740 A * 9/2015 ...... B60W 30/18036
CN 107901750 A 4/2018
(Continued)

OTHER PUBLICATIONS

EP '606A search report (dated 2021).*
(Continued)

*Primary Examiner* — Dirk Wright
(74) *Attorney, Agent, or Firm* — Andrew C. Cheng

(57) ABSTRACT

A power system for a hybrid vehicle includes a first planetary gear mechanism and a second planetary gear mechanism that cooperate with each other, wherein a first sun gear rotates with a first input shaft, a second sun gear and the first input shaft are independent from each other, the second sun gear achieve different movement states through a first brake, a second brake and a second clutch, to provide different transmission ratios, so that the power system is simple in structure, low in cost and more flexible in adaptability. Further, a second electric motor is connected with the first input shaft through a third planetary gear mechanism, can reduce the speed of the second electric motor through the planetary gear mechanism, and increase the torque, to effectively reduce the size of the second electric motor or improve the acceleration performance of the vehicle.

11 Claims, 4 Drawing Sheets

(56) References Cited

U.S. PATENT DOCUMENTS

| | | | |
|---|---|---|---|
| 9,227,505 B2* | 1/2016 | Hata | B60K 6/387 |
| 10,035,502 B2* | 7/2018 | Hokoi | B60K 6/445 |
| 10,086,686 B2* | 10/2018 | Mueller | F16H 3/727 |
| 10,166,974 B2* | 1/2019 | Kumazaki | B60K 6/445 |
| 10,543,831 B2* | 1/2020 | Kumazaki | F16H 61/0204 |
| 2006/0019785 A1 | 1/2006 | Holmes et al. | |
| 2015/0239332 A1* | 8/2015 | Okuda | B60K 6/26 60/716 |

FOREIGN PATENT DOCUMENTS

| | | | |
|---|---|---|---|
| CN | 108382182 A | 8/2018 | |
| CN | 108382183 A | 8/2018 | |
| CN | 108394265 A | 8/2018 | |
| CN | 109177716 A | 1/2019 | |
| DE | 102015216896 | 3/2017 | |
| JP | 2006187049 A * | 7/2006 | B60W 10/115 |
| JP | 2010023759 A | 2/2010 | |
| JP | 2013082317 A | 5/2013 | |
| JP | 2014019328 A | 2/2014 | |
| JP | 5943127 B1 * | 6/2016 | B60K 6/48 |
| KR | 20160027157 A * | 3/2016 | B60W 10/115 |
| WO | WO-2013108397 A1 * | 7/2013 | B60K 6/26 |
| WO | WO-2016038822 A1 * | 3/2016 | B60W 20/00 |
| WO | WO-2016063623 A1 * | 4/2016 | B60K 6/24 |

OTHER PUBLICATIONS

Reasons for Refusal from JP 2021-510032 (Year: 2021).*
Office Action with search report of Japanese Patent Application No. 2021-510032 dated Nov. 9, 2021.

* cited by examiner

POWER SYSTEM FOR HYBRID VEHICLE

TECHNICAL FIELD

The present invention relates to the technical field of hybrid vehicles, and in particular, to a power system for hybrid vehicles.

BACKGROUND OF THE INVENTION

At present, the use of petrol-electric hybrid power as a vehicle power source has increasingly become the mainstream trend of vehicle development. A hybrid vehicle usually includes an engine with a smaller displacement than a traditional engine and one or two electric motors. Under normal circumstances, when driving at low speeds (such as urban roads) or when frequent starting is required, the vehicle can be driven only by the electric motor; when high-speed driving is required, the vehicle can be driven only by the engine to save energy. In the prior art, the hybrid mode of a petrol-electric hybrid vehicle mainly includes three modes: series, parallel and hybrid.

The structure of the power system in the existing hybrid vehicle is relatively simple and has poor adaptability.

SUMMARY OF THE INVENTION

An object of the present invention is to provide a highly adaptable power system for hybrid vehicles.

A further object of the present invention is to adopt two planetary gear mechanisms to achieve three different transmission ratios of the power system and improve the fuel economy and acceleration performance of the power system.

In particular, the present invention provides a power system for a hybrid vehicle, wherein the power system includes an engine, a first electric motor, a second electric motor, a first planetary gear mechanism, a second planetary gear mechanism, a first input shaft, a first clutch, a second clutch, a first brake, a second brake, an intermediate shaft, and a differential;

the engine is drivingly connected to the first electric motor, the first clutch is arranged between the first electric motor and the first input shaft, and the power transmission between the first electric motor and the first input shaft is cut off or transmitted by the first clutch; the second electric motor is arranged on the first input shaft for driving the first input shaft to rotate;

the first planetary gear mechanism includes a first sun gear, a first planetary gear, a first ring gear, and a first planetary frame; the first sun gear is fixed on the first input shaft to cause the first sun gear to rotate with the first input shaft; the second planetary gear mechanism includes a second sun gear, a second planetary gear, a second ring gear, and a second planetary frame; the second sun gear and the first input shaft are independent of each other; the first brake is arranged between the second planetary frame and a casing of the power system; wherein the second ring gear is fixedly connected to the first planetary frame, the first ring gear is fixedly connected to the second planetary frame, and the second ring gear is used to transmit the power output by the power system;

the first brake is arranged between the second planetary frame and the casing of the power system; the second brake is arranged between the second sun gear and the casing of the power system, and the second clutch is arranged between the second sun gear and the first input shaft;

the second ring gear is drivingly connected to the intermediate shaft through an output gear of the power system to transmit power to the differential through the intermediate shaft.

Optionally, the second electric motor is connected to the first input shaft through a third planetary gear mechanism, the third planetary gear mechanism includes a third sun gear, at least one set of planetary gear, a third ring gear, and a third planetary frame;

wherein one of the third sun gear, the third ring gear and the third planetary frame is fixed relative to the casing of the power system, a second rotor of the second electric motor is drivingly connected to one of the unfixed members to provide power thereto, and the other unfixed member is drivingly connected to the first input shaft in order to drive the first input shaft;

Preferably, the third sun gear is fixedly connected to a rear casing; the third ring gear is fixed to the second rotor of the second electric motor and rotates with the second rotor, and the second electric motor transmits power to the first input shaft through the third planetary frame;

Preferably, the third sun gear is fixedly connected to the second rotor of the second electric motor and rotates with the second rotor, the third planetary frame is installed on the rear casing and is fixed relative to the rear casing, and the second electric motor transmits power to the first input shaft through the third ring gear;

Preferably, the third sun gear is drivingly connected to an output shaft of the second electric motor through a transmission chain, the third ring gear is installed on the rear casing and is fixed relative to the rear casing, and the second electric motor transmits power to the first input shaft through the third planetary frame.

Optionally, the second rotor of the second electric motor is drivingly connected to an unfixed member of the third planetary gear mechanism through a second rotor connecting plate.

Optionally, the power system further includes an intermediate support plate fixedly installed on a front casing near one end of the second planetary gear mechanism, wherein a cavity is formed between the intermediate support plate and the front casing for installing the first brake, a third actuating cylinder for the first brake, the second brake, and a fourth actuating cylinder for the second brake.

Optionally, the power system further includes a first actuating cylinder for the first clutch and a second actuating cylinder for the second clutch;

wherein the first actuating cylinder, the second actuating cylinder, the third actuating cylinder and the fourth actuating cylinder are all arranged in the front casing, and oil passages connected to the first actuating cylinder, the second actuating cylinder, the third actuating cylinder and the fourth actuating cylinder are provided in the front casing.

Optionally, the output gear is supported on the intermediate support plate through an output gear support bearing, and the intermediate support plate is supported on the second planetary frame through a sliding bearing.

Optionally, the power system further includes a second input shaft sleeved on the outside the first input shaft, wherein the first input shaft and the second input shaft are independent of each other;

one end of the second input shaft is fixedly connected with the second sun gear, the other end of the second input shaft is connected with the second clutch, and the second input shaft is further connected with the second brake.

Optionally, the power system further includes a driven gear meshed with the output gear and a parking ratchet for braking, wherein the driven gear and the parking ratchet are integrated.

Optionally, the differential is drivingly connected to a main reduction gear of the intermediate shaft through a fourth planetary gear mechanism, wherein the fourth planetary gear mechanism includes a fourth sun gear, at least one set of planetary gear, a fourth ring gear and a fourth planetary frame;

wherein one of the fourth sun gear, the fourth ring gear and the fourth planetary frame is fixed relative to the casing of the power system, the main reduction gear is drivingly connected to one of the unfixed members to provide power thereto, and the other unfixed member is drivingly connected to an input end of the differential to drive the differential.

Optionally, the first actuating cylinder controls the first clutch through a first release bearing, and the second actuating cylinder controls the second clutch through a second release bearing.

The power system for the hybrid vehicle of the present invention adopts the first planetary gear mechanism and the second planetary gear mechanism that cooperate with each other, wherein the first sun gear rotates with the first input shaft, the second sun gear and the first input shaft are independent of each other, the planetary gear mechanisms can achieve different motion states through engagement or disengagement of the first brake, the second brake and the second clutch (cooperating with each other) to provide different transmission ratios, so that the power system is simple in structure, low in cost, and more flexible in adaptability.

Further, the second electric motor of the present invention is connected to the first input shaft through the third planetary gear mechanism, which can reduce the speed of the second electric motor and increase the torque through the planetary gear mechanism, so as to effectively reduce the size of the second electric motor or improve the acceleration performance of the vehicle.

Based on the following detailed description of specific embodiments of the present invention in conjunction with the accompanying drawings, those skilled in the art will better understand the above and other objectives, advantages and features of the present invention.

BRIEF DESCRIPTION OF THE DRAWINGS

Hereinafter, some specific embodiments of the present invention will be described in detail in an exemplary but not restrictive manner with reference to the accompanying drawings. The same reference signs in the drawings indicate the same or similar components or parts. Those skilled in the art should understand that these drawings are not necessarily drawn to scale. In the drawings.

DETAILED DESCRIPTION OF PREFERRED EMBODIMENTS

Hereinafter, the power system 100 according to the embodiment of the present invention will be described with reference to FIGS. 1 to 4.

Figure 1:
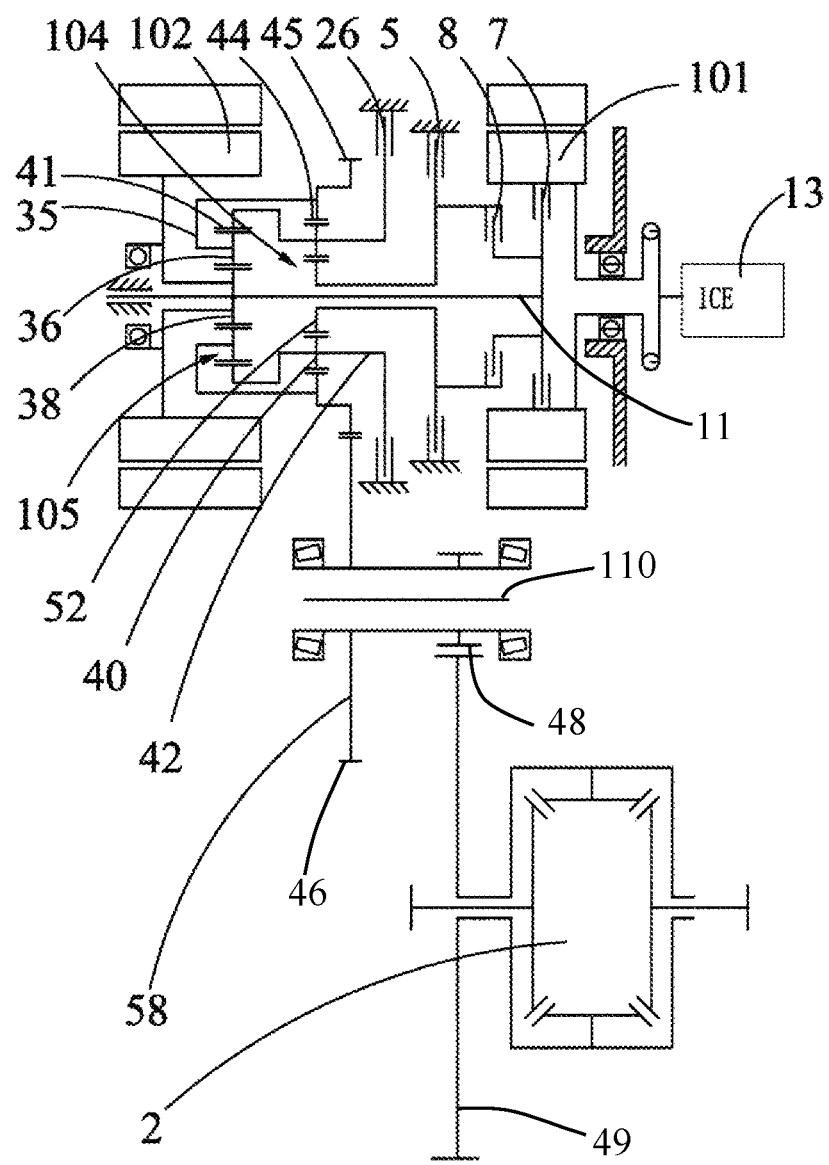
FIG. 1 is a schematic principle diagram of a power system according to an embodiment of the present invention.

FIG. 1 is a schematic principle diagram of a power system 100 according to an embodiment of the present invention. As shown in FIG. 1, the power system 100 for a hybrid vehicle in this embodiment is applicable to two-wheel drive and four-wheel drive vehicles. The power system 100 includes an engine 13, a first electric motor 101, a second electric motor 102, a first planetary gear mechanism 105, a second planetary gear mechanism 104, a first input shaft 11, a first clutch 7, a second clutch 8, a first brake 26, a second brake 5, an intermediate shaft 110 and a differential 2.

The engine 13 is drivingly connected to the first electric motor 101, the first clutch 7 is arranged between the first electric motor 101 and the first input shaft 11, and the power transmission between the engine 13 (and/or the first electric motor 101) and the first input shaft 11 can be cut off or transmitted by the first clutch 7. Specifically, the end of the crankshaft of the engine 13 is connected to a drive shaft 12 via a dual-mass flywheel 14, the first outer hub 16 of the first clutch 7 connected to the first rotor 17 is connected to the drive shaft 12 through splines, and the first outer hub 16 is supported on a front end cover 15 by a first outer hub support bearing 10. The dual-mass flywheel 14 can be a shock absorber, a single-mass flywheel or a connecting disc. The power of the engine 13 can be cut off or transmitted when the first clutch 7 is disengaged or engaged.

The second electric motor 102 is drivingly connected to the first input shaft 11 for driving the first input shaft 11 to rotate. The first planetary gear mechanism 105 includes a first sun gear 38, a first planetary gear 36, a first ring gear 41, and a first planetary frame 35. The first sun gear 38 is fixed on the first input shaft 11, so that the first sun gear 38 rotates with the first input shaft 11. The second planetary gear mechanism 104 includes a second sun gear 52, a second planetary gear 40, a second ring gear 44, and a second planetary frame 42. The second sun gear 52 and the first input shaft 11 are independent of each other. The second ring gear 44 is fixedly connected or drivingly connected to the first planetary frame 35, and the first ring gear 41 is fixedly connected or drivingly connected to the second planetary frame 42. The second ring gear 44 is used to transmit the power output by the power system 100.

The first brake 26 is arranged between the second planetary frame 42 and the casing of the power system 100, and a corrugated spring (not shown) is arranged between the friction plates of the first brake 26 to reduce the drag torque when the inner hub of the first brake 26 rotates at high speed and improve the efficiency. The second brake 5 is arranged between the second sun gear 52 and the casing of the power system 100, and a corrugated spring (not shown) is also arranged between the friction plates of the second brake 5 to reduce the drag torque when the inner hub of the second brake 5 rotates at high speed and improve the efficiency. The above two brakes may also be band brakes as required. The second clutch 8 is arranged between the second sun gear 52 and the first input shaft 11, and used to realize or cut off the power transmission between the second sun gear 52 and the first input shaft 11. The second ring gear 44 is drivingly connected to the intermediate shaft 110 through the output gear 45 of the power system 100 to transmit power to the differential 2 through the intermediate shaft 110.

With the above structures, three gear modes of the vehicle can be realized. The details are as follows. When the first brake 26 is engaged while the second brake 5 and the second clutch 8 are each disengaged, the second planetary frame 42 of the second planetary gear mechanism 104 is fixedly connected to the casing of the power system 100 through the engagement of the first brake 26, and the power is transmitted to the output shaft by the first planetary frame 35. At this time, the power system 100 has a transmission ratio, that is, the first gear, which can be used to assist the motor to start or accelerate. When the second brake 5 is engaged while the first brake 26 and the second clutch 8 are each disengaged, the second sun gear 52 is fixedly connected to the casing of the power system 100 through the engagement of the second brake 5, and the power is transmitted to the output shaft by the second ring gear 44. At this time, the power system 100 has another transmission ratio, that is, the second gear, which can be used to drive the vehicle at high speed or to generate electricity efficiently. When the second clutch 8 is engaged while the first brake 26 and the second brake 5 are each disengaged, the second sun gear 52 rotates with the first input shaft 11. At this time, the two sun gears 38, 52 rotate with the first input shaft 11, which is equivalent to internally locking the first planetary gear mechanism 105, and the final transmission ratio of the power system 100 is independent of the first planetary gear mechanism 105, and it is in the third gear.

Figure 2:
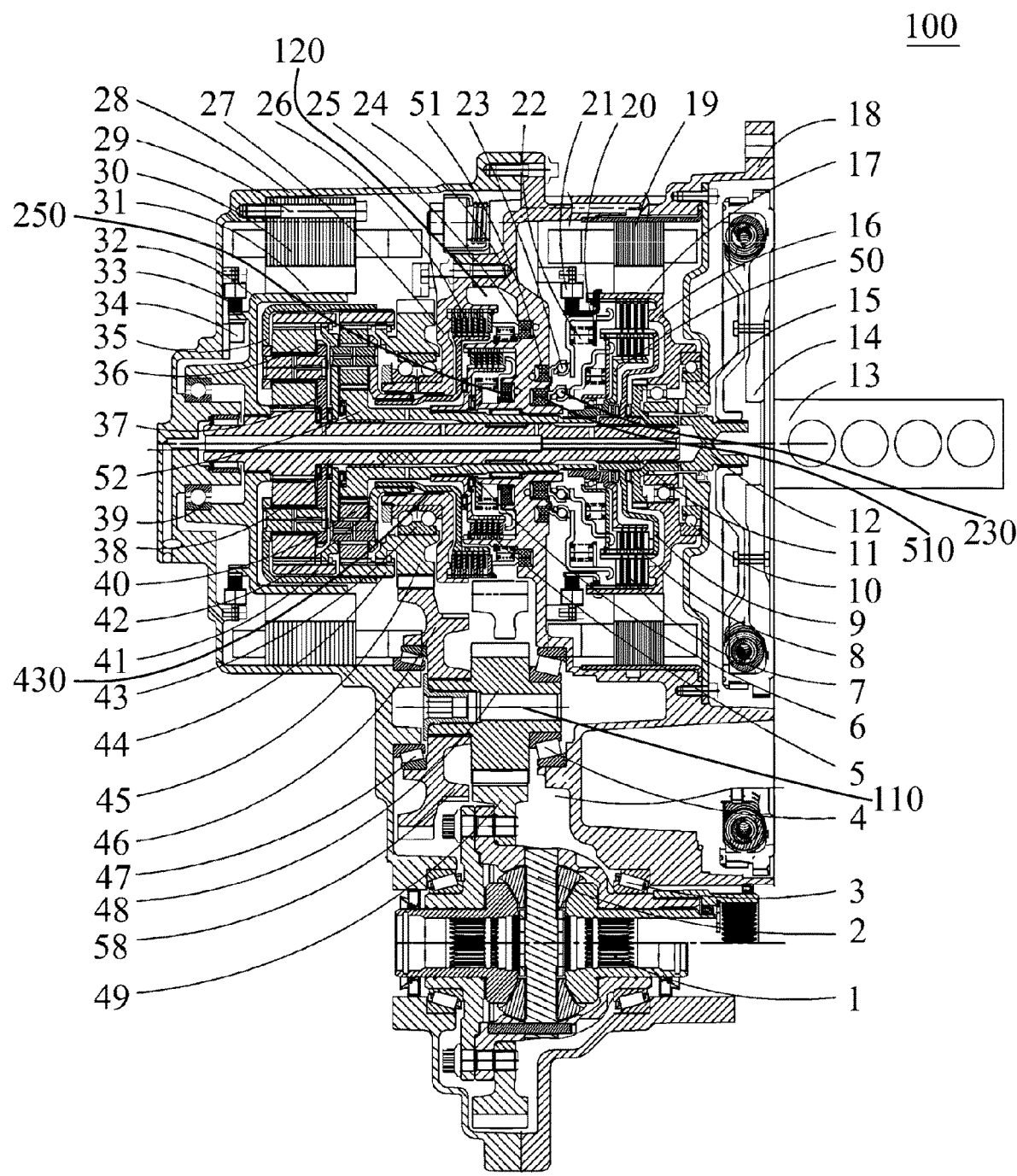
FIG. 2 is a schematic structural diagram of a power system according to another embodiment of the present invention.

FIG. 2 is a schematic structural diagram of a power system 100 according to another embodiment of the present invention. In the structural diagram as shown in FIG. 2, the power system 100 includes, but is not limited to the following structures: drive half shaft 1, differential 2, differential support bearing 3, intermediate shaft support bearing 4, second brake 5, second input shaft 6, first clutch 7, second clutch 8, first inner hub 9, first outer hub support bearing 10, first input shaft 11, drive shaft 12, engine 13, dual-mass flywheel 14, front end cover 15, second inner hub 50, first outer hub 16, first rotor 17, front casing 18, first stator 19, first rotor connecting plate 20, first rotational speed sensor 21, first return spring 22, first release bearing 23, first actuating cylinder 51, rear end cover 24, third actuating cylinder 25, first brake 26, intermediate support plate 27, rear casing 28, fixing bolt 29, second stator 30, second rotor 31, second rotor connecting plate 32, second rotational speed sensor 33, second position sensor 34, first planetary frame 35, first planetary gear 36, first planetary gear cover 37, second sun gear 52, first sun gear 38, second rotor connecting plate support bearing 39, second planetary gear 40, first ring gear 41, second planetary frame 42, output gear support bearing 43, second ring gear 44, output gear 45, driven gear 46, driven gear support bearing 47, main reduction gear 48, parking ratchet 58, differential ring gear 49, inverter 54, and parking mechanism 53.

Referring to FIG. 2, the first electric motor 101, the first clutch 7 and the second clutch 8 are all arranged in the accommodation space of the front casing 18. The first rotor 17 of the first electric motor 101 is splined with the first input shaft 11 via the outer hub of the first clutch 7. A cooling water jacket for cooling the first electric motor 101 is provided between the first electric motor 101 and the inner wall of the front casing 18. Specifically, the cooling water jacket is provided on the periphery of the first stator 19 to cool the first electric motor 101. A first actuating cylinder 51 for the first clutch 7 and a second actuating cylinder 510 for the second clutch 8 are further provided in the front casing 18. The first actuating cylinder 51 and the second actuating cylinder 510 are arranged in the front casing 18, and oil passages connected to the first actuating cylinder 51 and the second actuating cylinder 510 are provided in the front casing 18. The rotating part of the first rotational speed sensor 21 is fixed on the first rotor connecting plate 20 to detect the rotational speed of the first electric motor (generator). With continued reference to FIG. 1, the first actuating cylinder 51 controls the first clutch 7 through the first release bearing 23, and the second actuating cylinder 510 controls the second clutch 8 through the second release bearing 230. Specifically, after receiving the engagement signal, the first actuating cylinder 51 pushes the first release bearing 23 to cause the first clutch 7 to be engaged. When the engagement signal disappears, the first clutch 7 is disengaged under the action of the first return spring 22. In other embodiments, the first release bearing 23 and the second release bearing 230 may also be a balance cavity structure of an automatic transmission (AT) structure. In this embodiment, two release bearings 23, 230 are used to replace the balance cavity structure to save layout space.

The first actuating cylinder 51 of the first clutch 7 is arranged on the rear end cover 24, and the pressure oil pushes the first release bearing 23 through the first actuating cylinder 51 to overcome the resistance of the first return spring 22, so that the first clutch 7 is engaged. The first inner hub 9 of the first clutch 7 is splined with the first input shaft 11 to transmit power from the engine 13 to the first input shaft 11. The second inner hub 50 of the second clutch 8 is splined with the second input shaft 6, and is engaged or disengaged under the action of the second actuating cylinder 510 and the second release bearing 230 to connect or disconnect the first input shaft 11 and the second input shaft 6. The first release bearing 23 or the second release bearing 230 of the above clutches may also adopt a balance cavity structure to compress or loosen the friction plates. The second actuating cylinder 510 of the second clutch 8 is provided on the rear end cover 24. The rear end cover 24 is provided with oil passages connected to the cylinders of the brakes and the clutches.

The power system 100 further includes an intermediate support plate 27 fixedly installed on the front casing 18 near one end of the second planetary gear mechanism 104. A cavity 120 is formed between the intermediate support plate 27 and the front casing 18 for installing the first brake 26, the third actuating cylinder 25 for the first brake 26, the second brake 5, and the fourth actuating cylinder 250 for the second brake 5. The intermediate support plate 27 is fixed to the rear end cover 24 by bolts, one side of the intermediate support plate 27 forms a sealed space with the rear end cover 24 for arranging the first brake 26 and the second brake 5, and the output gear 45 is supported by the output gear support bearing 43 on the other side of the intermediate support plate 27 to eliminate radial and axial loads. Specifically, a relatively closed cavity is formed between the intermediate support plate 27 and the rear end of the front casing 18, and the first brake 26, the second brake 5, the third actuating cylinder 25 and the fourth actuating cylinder 250 are all arranged in this cavity, so that this space can be used effectively. The brakes 26, 5 can be a multi-disc clutch brake or a band brake, and oil passages connected to the third actuating cylinder 25 and the fourth actuating cylinder 250 are provided in the front casing 18.

The above arrangement of the four actuating cylinders 51, 510, 25, 250 saves space on the one hand; on the other hand, the pressure oil can directly enter the actuating cylinders through the oil passages in the front casing 18, to facilitate the sealing of high pressure oil and shorten the oil path. The centralized arrangement of the above four actuating cylinders 51, 510, 25, 250 further facilitates the arrangement and management of the high-pressure oil passages of the system.

With continued reference to FIG. 2, the second ring gear 44 is connected to the output gear 45 of the power system 100 through splines. The output gear 45 is supported on the intermediate support plate 27 through the output gear support bearing 43. The inner end surface of the intermediate support plate 27 is connected to the second planetary frame 42 through a sliding bearing 430. The second ring gear 44 is connected to the output gear 45 through splines. The inner side of the output gear 45 is supported on the intermediate support plate 27 through the output gear support bearing 43, and the outer side of the output gear 45 meshes with the driven gear 46 of the intermediate shaft 110 to output power. The left side of the driven gear 46 is supported on the casing by the driven gear support bearing 47, to improve the support rigidity and increase the transmission torque. In this way, the power can be synchronously, stably and efficiently transmitted to the output gear 45 from the second ring gear 44 of the second planetary gear mechanism 104. In this embodiment, since the intermediate support plate 27 is arranged on the rear end surface of the front casing 18, and then the inner end surface of the intermediate support plate 27 is connected to the first planetary frame 35 through a bearing, the radial force generated by the meshing of the output gear 45 can be effectively transmitted. Further, the power system 100 further includes a parking ratchet 58 for braking, wherein the driven gear 46 and the parking ratchet 58 are integrated. Due to an integrated structure of the driven gear 46 and the parking ratchet 58, it is helpful to save layout space, reduce the processing of parts, and save costs.

With continued reference to FIG. 2, the second electric motor 102, the first planetary gear mechanism 105 and the second planetary gear mechanism 104 are arranged in the accommodation space of the rear casing 28. A cooling water jacket for cooling the second electric motor 102 is provided between the second electric motor (driving motor) 102 and the inner wall of the rear casing 28. The first planetary gear mechanism 105 is arranged in the inner cavity of the second rotor 31, to shorten the axial length of arrangement. The first sun gear 38 is integrated with the first input shaft 11, the first planetary frame 35 and the second ring gear 44 are fixedly connected or drivingly connected, and the first ring gear 41 and the second planetary frame 42 are fixedly connected or drivingly connected. The second planetary frame 42 is connected to the inner hub of the first brake 26. The second ring gear 44 is connected to the output gear 45 through splines.

The power system 100 further includes a second input shaft 6 sleeved on the outside of the first input shaft 11, and the first input shaft 11 and the second input shaft 6 are independent of each other. The first planetary frame 35 is connected to the first input shaft 11 through the second input shaft 6 and the second clutch 8. One end of the second input shaft 6 is fixedly connected with the second sun gear 52, the other end of the second input shaft 6 is connected with the second clutch 8, and the second input shaft 6 is further connected with the second brake 5. Specifically, the second sun gear 52 of the second planetary gear mechanism 104 may be integrated with the second input shaft 6. In this way, three components are connected to a hollow shaft which is sleeved on the first input shaft 11, to effectively shorten the radial space of the transmission and make the layout more compact. One end of the first input shaft 11 is supported on the rear casing 28 of the transmission through a bearing, and the other end of the first input shaft 11 is supported inside the drive shaft 12 through a bearing. The second input shaft 6 is sleeved on the first input shaft 11 through a bearing, and is independent of the first input shaft 11. The first input shaft 11 and the second input shaft 6 are provided with oil passages and oil holes for cooling and lubricating the clutches, the brakes and the bearings.

Further, the second electric motor 102 is connected to the first input shaft 11 through a third planetary gear mechanism 300. The third planetary gear mechanism 300 includes a third sun gear 301, at least one set of planetary gear 302, a third ring gear 303, and a third planetary frame 304. One of the third sun gear 301, the third ring gear 303 and the third planetary frame 304 is fixed relative to the casing of the power system 100, the second rotor 31 of the second electric motor 102 is connected to one of the unfixed members to provide power thereto, and the other unfixed member is connected to the first input shaft 11 in order to drive the first input shaft 11. Specifically, six different transmission modes can be realized between the second electric motor 102 and the first input shaft 11, and the most suitable transmission mode can be selected according to the actual required transmission ratio, the size of the second electric motor 102, and the installation position of the second electric motor 102.

In a preferred embodiment, the third sun gear 301 is fixedly connected to the rear casing 28; the third ring gear 303 is fixed to the second rotor 31 of the second electric motor 102 and rotates with the second rotor 31, and the second electric motor 102 transmits power to the first input shaft 11 through the third planetary frame 304. Specifically, the second electric motor 102 is coaxially arranged with the first input shaft 11. The second rotor 31 of the second electric motor 102 is fixedly connected to the third ring gear 303 through the second rotor connecting plate 32. In this embodiment, by using the second rotor connecting plate 32, the second rotor 31 of the second electric motor 102 is connected to the third ring gear 303 through splines (or using locking or riveting or fixing), such that the power is transmitted from the second electric motor 102 to the third planetary gear mechanism 300. The second rotor connecting plate 32 can be supported on the rear casing 28 of the transmission by one or more bearings according to the requirements of the force. This arrangement allows the third planetary gear mechanism 300 to be arranged inside the second rotor 31, to optimize the layout space and shorten the axial length. Further, according to the power requirements of the vehicle, the connection mode of the rotor 31 and the third planetary gear mechanism 300 can be changed by varying the arrangement, so as to change the motor torque and the transmission ratio to meet the requirements of the vehicle.

In another preferred embodiment, the third sun gear 301 is fixedly connected to the second rotor 31 of the second electric motor 102 and rotates with the second rotor 31, the third planetary frame 304 is installed on the rear casing 28 and is fixed relative to the rear casing 28, and the second electric motor 102 transmits power to the first input shaft 11 through the third ring gear 303.

In another preferred embodiment, the third sun gear 301 is drivingly connected to the output shaft of the second electric motor 102 through a transmission chain, the third ring gear 303 is installed on the rear casing 28 and is fixed relative to the rear casing 28, and the second electric motor 102 transmits power to the first input shaft 11 through the third planetary frame 304.

In the power system 100 of the hybrid vehicle of the present invention, since the second electric motor 102 is drivingly connected to the first input shaft 11 through the third planetary gear mechanism 300, the speed of the second electric motor 102 can be reduced through the planetary gear mechanism 300, and the torque can be increased to effectively reduce the size of the second electric motor 102 or improve the acceleration performance of the vehicle. Since the first clutch 7 between the first input shaft 11 and the engine 13 is disengaged when the second electric motor 102 operates to drive, the drag resistance of the engine 13 is reduced, and the fuel economy of the vehicle is improved.

In one embodiment, a first rotational speed sensor 21 for detecting the rotational speed of the first electric motor 101 and a second rotational speed sensor 33 for detecting the rotational speed of the second electric motor 102 are further provided in the casing of the transmission. The second stator 30 of the second electric motor 102 is fixed to the rear casing 28 of the transmission by the fixing bolt 29, and the second rotor 31 of the second electric motor 102 is fixedly connected to the second rotor connecting plate 32 and supported on the rear casing 28 of the transmission through the second rotor connecting plate support bearing 39. The second rotational speed sensor 33 (providing signals required to control the motor) is installed on the left extension portion of the second rotor connecting plate 32, for detecting the rotational speed of the second electric motor 102. The second rotor connecting plate 32 is splined with the first input shaft 11, so that the power of the second electric motor 102 can be superimposed and output with the power of the engine 13.

In one embodiment, the front casing 18 and the rear casing 28 are fixedly connected by bolts or other connection methods to form a complete transmission casing (or the casing of the power system 100). In other embodiments, the entire casing may also be integrated. Two ends of the first input shaft 11 are drivingly connected to the first electric motor 101 and the second electric motor 102 respectively. The end of the crankshaft of the engine 13 is connected to the motor input shaft of the first electric motor 101 via the dual-mass flywheel 14. In other embodiments, the dual-mass flywheel 14 may also be replaced by a shock absorber, a single-mass flywheel or a connecting disc. The second ring gear 44 of the second planetary gear mechanism 104 is used to output power. The output gear 45 splined with the second ring gear 44 is supported on the intermediate support plate 27 through the support bearing 43, and meshes with the driven gear 46 on the intermediate shaft 110 to transmit input power to the intermediate shaft 110. The second rotor 31 of the second electric motor 102 is connected to the third ring gear 303 of the third planetary gear mechanism 300 through the second rotor connecting plate 32, and then is supported on the rear casing 28 of the transmission through a support bearing. The third sun gear 301 of the third planetary gear mechanism 300 is fixed on the rear casing 28 of the transmission. In this embodiment, the output member of the third planetary gear mechanism 300 is the third planetary frame 304. The third planetary gear mechanism 300 changes the speed of the second electric motor 102 and transmits it to the first input shaft 11, and then transmits the input speed, after shifting, to the intermediate shaft 110 through the first planetary gear mechanism 105 and the second planetary gear mechanism 104. The main reduction gear 48 of the intermediate shaft 110 then drives the differential ring gear 49 on the differential, and transmits the driving power of the engine 13 and the second electric motor 102 to the differential output shaft to drive the vehicle to move.

Further, according to the requirements of the transmission ratio, the transmission ratio of the main reduction gear 48 and the differential ring gear 49 can be adjusted in the layout space to meet the needs of the vehicle, which is beneficial to platform development.

Figure 3:
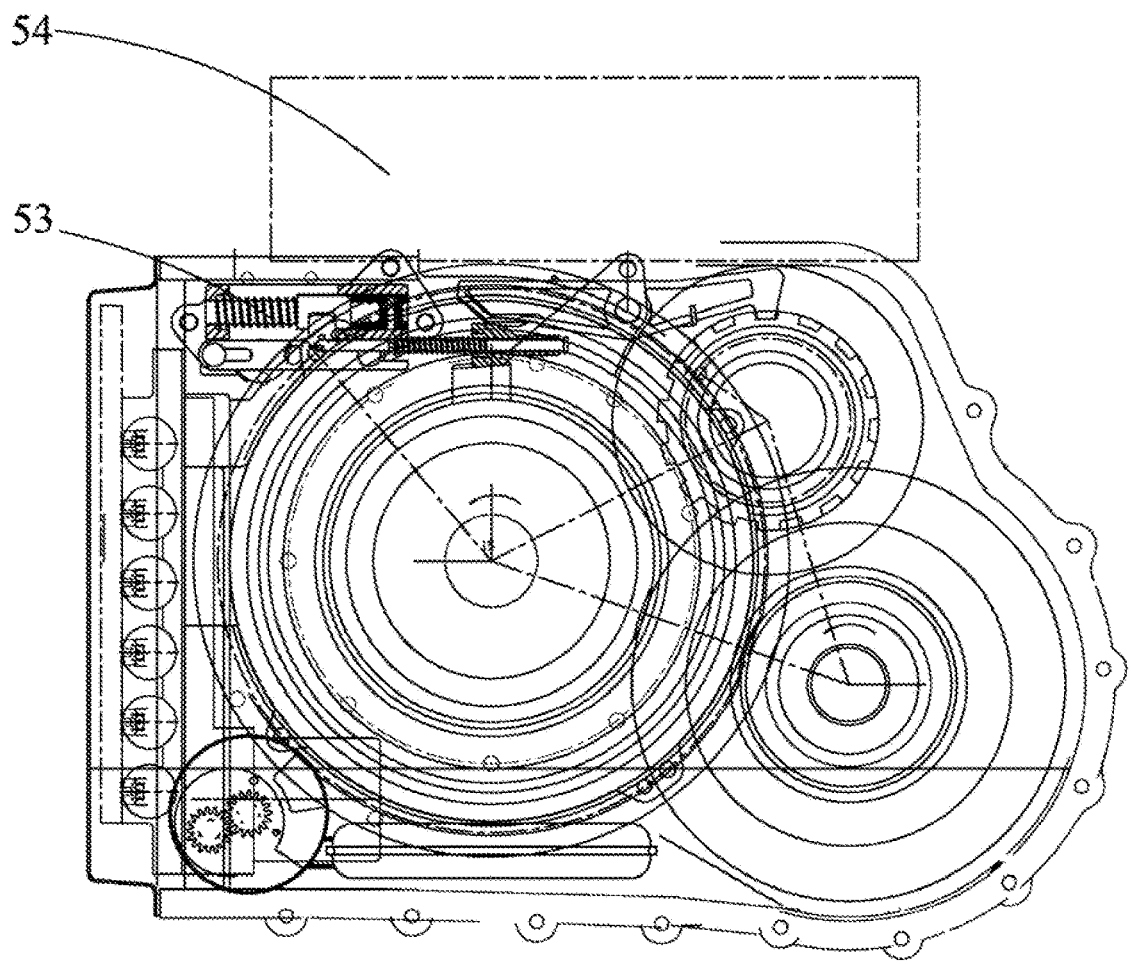
FIG. 3 is a schematic side view of the power system shown in FIG. 2.

FIG. 3 is a schematic side view of the power system 100 shown in FIG. 2. As shown in FIG. 3, it further includes an inverter 54 and a parking mechanism 53. The inverter 54 is used to convert DC electric energy (battery, storage battery) into alternating current. The parking mechanism 53 is used to keep the vehicle in place when the vehicle stands at a standstill.

Figure 4:
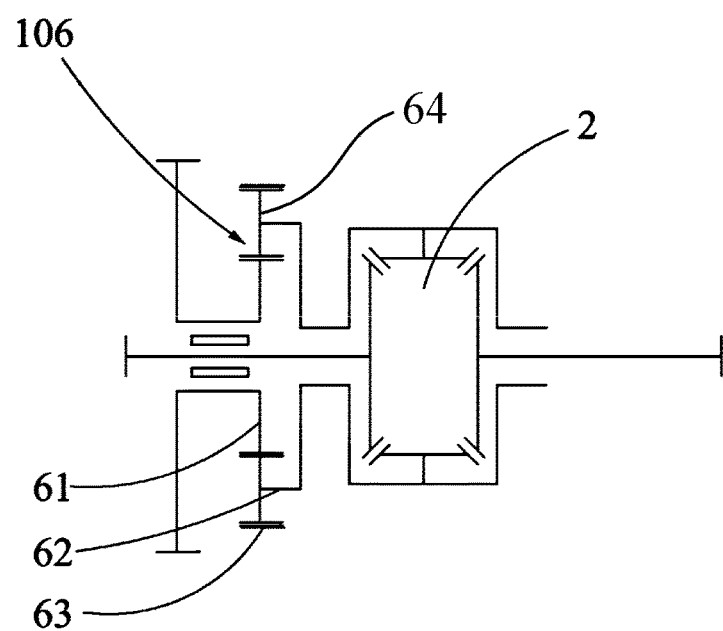
FIG. 4 is a schematic structural diagram of the differential in the power system connected to the output gear through a planetary gear mechanism according to the present invention.
Figure 5:
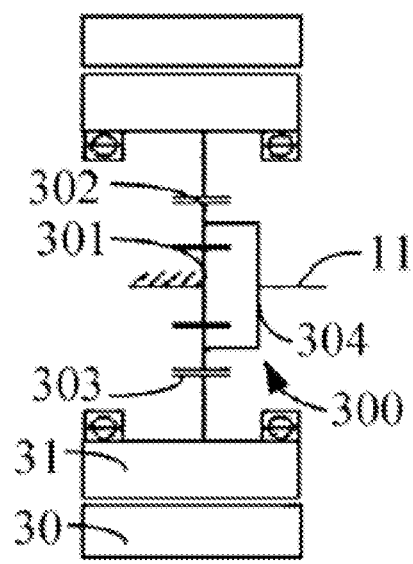
FIG. 5 is a schematic structural diagram of a third planetary gear mechanism according to an embodiment of the present invention.

FIG. 4 is a schematic structural diagram in which the differential 2 in the power system 100 is connected to the output gear 45 through a planetary gear mechanism. As shown in FIG. 4, the differential 2 is connected to the main reduction gear 48 of the intermediate shaft 110 through a fourth planetary gear mechanism 106, wherein the fourth planetary gear mechanism 106 includes a fourth sun gear 61, at least one set of planetary gear 64, a fourth ring gear 63, and a fourth planetary frame 62. One of the fourth sun gear 61, the fourth ring gear 63 and the fourth planetary frame 62 is fixed relative to the casing of the power system 100, the main reduction gear 48 is connected to one of the unfixed members to provide power thereto, and the other unfixed member is connected to the input end of the differential 2 to drive the differential 2. Specifically, six different transmission modes can be realized between the second electric motor 102 and the first input shaft 11, and the most suitable transmission mode can be selected according to the actual required transmission ratio, the size of the second electric motor 102, and the installation position of the second electric motor 102.

In a specific embodiment, the input end of the differential 2 is connected to the main reduction gear 48 of the intermediate shaft 110 through the fourth planetary gear mechanism 106, wherein the fourth ring gear 63 of the fourth planetary gear mechanism 106 is fixed, the power is inputted from the fourth sun gear 61 and transmitted to the fourth planetary frame 62 integrated with the casing of the differential 2, and then the power is output from the differential output shaft.

The following are multiple working modes of the power system 100 in this embodiment, which are specifically as follows:

(1) Starting of the Engine 13 and Charging

The engine 13 is connected to the first rotor 17 via the dual-mass flywheel 14, the drive shaft 12 and the first outer hub 16 of the first clutch 7. The engine 13 can be started when the generator runs. On the contrary, when the engine 13 runs, it can drive the generator to charge the battery. Since the main function of the generator is to generate electricity, and the speed of the generator is always consistent with that of the engine 13, the high-efficiency speed zones of the engine 13 and the generator should be designed to be consistent.

(2) Driving Individually by the Engine 13

When the engine 13 runs and the first clutch 7 is engaged, all or part of the power of the engine 13 is transmitted to the first input shaft 11. If the first brake 26 is engaged, the first ring gear 41 is fixed, the first sun gear 38 on the first input shaft 11 drives the first planetary gear 36 and the first planetary frame 35 to rotate, and outputs power to the output gear 45 to drive the driven gear 46 to rotate. According to the requirements of power and the working conditions, the states of the first brake 26, the second brake 5 and the second clutch 8 are respectively changed to vary the transmission ratios.

For example, if the first brake 26 is engaged, the transmission ratio is around 13, which can be used for climbing and starting conditions; if the first brake 26 is disengaged and the second brake 5 is engaged, the transmission ratio is around 6, which can be used in urban low-speed conditions; if the second brake 5 is disengaged and the second clutch 8 is engaged, the transmission ratio is 1, which can be used for high-speed cruising and is compatible with the economic area of the engine 13. The transmission ratio herein refers to the ratio of the rotational speed of the first input shaft 11 to the rotational speed of the output gear 45.

(3) Driving Individually by the Electric Motor 102

When the first clutch 7 is disengaged and the second electric motor 102 runs, it can effectively avoid the drag torque of the engine 13 during electric driving and improve the efficiency. The second rotor 31 of the second electric motor 102 is connected to the first input shaft 11 via the second rotor connecting plate 32 so as to drive the first sun gear 38 to rotate. According to the requirements of power and the working conditions, the states of the first brake 26, the second brake 5 and the second clutch 8 are respectively changed to vary the transmission ratios, thereby varying the rotational speed of the output gear 45.

(4) Driving Simultaneously by the Engine 13 and the Electric Motor 102

When the second electric motor 102 and the engine 13 run simultaneously, and the first clutch 7 is engaged, the torque of the engine 13 is subtracted from the torque of the first electric motor 101 and then transmitted to the first input shaft 11 via the first clutch 7. The torque of the second electric motor 102 is also superimposed on the first input shaft 11. If the torque of the second electric motor 102 is controlled to be the peak torque, the maximum input torque (on the first input shaft 11) is as follows according to the following equation:

$$T_{in} = T_{p3} + T_e$$

In the formula: $T_e$ is the output torque of the engine 13; $T_{p3}$ is the output torque of the second electric motor 102; $T_{in}$ is the input torque.

This torque is equivalent to twice the output torque of an ordinary engine 13, which can ensure good acceleration performance of the vehicle.

(5) Shifting

When the engine 13 runs, and the first clutch 7 and the first brake 26 are each engaged, the torque of the engine 13 is transmitted to the first input shaft 11 via the first clutch 7. The first sun gear 38 is the input gear, the output gear is the output gear 45, and at this time, the transmission ratio is which is the first gear. When the speed is higher than the set value k0, the first brake 26 is disengaged and the second brake 5 is engaged, and at this time, the transmission ratio is $i_2$, which is the second gear. When the speed is higher than the set value k1, the second brake 5 is disengaged and the second clutch 8 is engaged, and at this time, the transmission ratio is 1, which is the third gear. It is assumed: $a = Z_{46}/Z_{45}$ (wherein a represents the gear ratio of the driven gear 46 to the output gear 45, Z represents the number of teeth of meshed gears); $b = Z_{49}/Z_{48}$; (wherein b represents the gear ratio of the differential ring gear 49 and the main reduction gear 48, Z represents the number of teeth of meshed gears), then the product of the two is $i_d$, $i_d = a*b$. Then, the total transmission ratio of the first gear driven by the engine 13 is $i_1*i_d$; the total transmission ratio of the second gear is $i_2*i_d$; the total transmission ratio of the third gear is $i_d$, which is used to drive the vehicle at high speed or efficiently generate electricity.

(6) Vehicle Braking Energy Recovery

When the vehicle decelerates and brakes, and the first brake 26 is engaged, the vehicle inertia is transmitted, via the drive half shaft 1, the differential 2, the main reduction gear 48, the intermediate shaft 110, the output gear 45, the second planetary gear mechanism 104 and the first planetary gear mechanism 105, to the first input shaft 11 to drive the second rotor 31 to rotate and generate electricity, to thereby realize the recovery of braking energy.

In summary, the power system 100 of the present invention can realize several working modes as shown in the following table:

| modes | gear | | driving | | | frictional elements | | | |
|---|---|---|---|---|---|---|---|---|---|
| | ICE | P3 | ICE | P3 | P1 | C0 | C3 | B1 | B2 |
| engine starting | / | | | | ✓ | | | | |
| electric driving—low speed | | 1 | | ✓ | | | | | ✓ |
| electric driving—urban | | 2 | | ✓ | | | | | ✓ |
| electric driving—high speed | | 3 | | ✓ | | | ✓ | | |
| engine driving—starting | 1 | | ✓ | | | ✓ | | ✓ | |
| engine driving—urban | 2 | | ✓ | | | ✓ | | | ✓ |
| engine driving—high speed | 3 | | ✓ | | | ✓ | ✓ | | |
| generating electricity by engine | / | | ✓ | | ✓ | ✓ | | | |
| electric power—assisted | / | | ✓ | ✓ | | ✓ | | | ✓ |
| braking energy recovery | / | | | ✓ | | | | | ✓ | wherein IGE refers to the engine 13, P1 refers to the first electric motor 101, P3 refers to the second electric motor 102, C0 refers to the first clutch 7, C3 refers to the second clutch 8, B1 refers to the first brake 26, and B2 refers to the second brake 5.

So far, those skilled in the art should realize that although several exemplary embodiments of the present invention have been illustrated and described in detail herein, many other variations or modifications can be made according to the content disclosed without departing from the spirit and scope of the present invention. Therefore, the scope of the present invention should be understood and deemed to cover all these other variations or modifications.

What is claimed is:

1. A power system for a hybrid vehicle, wherein the power system comprises an engine, a first electric motor, a second electric motor, a first planetary gear mechanism, a second planetary gear mechanism, a first input shaft, a first clutch, a second clutch, a first brake, a second brake, an intermediate shaft, and a differential;

the engine is drivingly connected to the first electric motor, the first clutch is arranged between the first electric motor and the first input shaft, and the power transmission between the first electric motor and the first input shaft is cut off or transmitted by the first clutch; the second electric motor is arranged on the first input shaft for driving the first input shaft to rotate;

the first planetary gear mechanism comprises a first sun gear, a first planetary gear, a first ring gear, and a first planetary frame; the first sun gear is fixed on the first input shaft to cause the first sun gear to rotate with the first input shaft; the second planetary gear mechanism comprises a second sun gear, a second planetary gear, a second ring gear, and a second planetary frame; the second sun gear and the first input shaft are independent of each other; the first brake is arranged between the second planetary frame and a casing of the power system; wherein the second ring gear is fixedly connected to the first planetary frame, the first ring gear is fixedly connected to the second planetary frame, and the second ring gear is used to transmit the power output by the power system;

the first brake is arranged between the second planetary frame and the casing of the power system; the second brake is arranged between the second sun gear and the casing of the power system, and the second clutch is arranged between the second sun gear and the first input shaft;

the second ring gear is drivingly connected to the intermediate shaft through an output gear of the power system to transmit power to the differential through the intermediate shaft.

2. The power system according to claim 1, wherein the second electric motor is connected to the first input shaft through a third planetary gear mechanism, the third planetary gear mechanism comprises a third sun gear, at least one set of planetary gear, a third ring gear, and a third planetary frame;

wherein one of the third sun gear, the third ring gear and the third planetary frame is fixed relative to the casing of the power system, a second rotor of the second electric motor is drivingly connected to one of the unfixed members to provide power thereto, and the other unfixed member is drivingly connected to the first input shaft in order to drive the first input shaft.

3. The power system according to claim 2, wherein the second rotor of the second electric motor is drivingly connected to an unfixed member of the third planetary gear mechanism through a second rotor connecting plate.

4. The power system according to claim 1, further comprising an intermediate support plate fixedly installed on a front casing near one end of the second planetary gear mechanism, wherein a cavity is formed between the intermediate support plate and the front casing for installing the first brake, a third actuating cylinder for the first brake, the second brake, and a fourth actuating cylinder for the second brake.

5. The power system according to claim 4, further comprising a first actuating cylinder for the first clutch and a second actuating cylinder for the second clutch;

wherein the first actuating cylinder, the second actuating cylinder, the third actuating cylinder and the fourth actuating cylinder are all arranged in the front casing, and oil passages connected to the first actuating cylinder, the second actuating cylinder, the third actuating cylinder and the fourth actuating cylinder are provided in the front casing.

6. The power system according to claim 4, wherein the output gear is supported on the intermediate support plate through an output gear support bearing, and the intermediate support plate is supported on the second planetary frame through a sliding bearing.

7. The power system according to claim 1, further comprising a second input shaft sleeved on the outside the first input shaft, wherein the first input shaft and the second input shaft are independent of each other;

one end of the second input shaft is fixedly connected with the second sun gear, the other end of the second input shaft is connected with the second clutch, and the second input shaft is further connected with the second brake.

8. The power system according to claim 1, wherein the power system further comprises a driven gear meshed with the output gear and a parking ratchet for braking, wherein the driven gear and the parking ratchet are integrated.

9. The power system according to claim 1, wherein the differential is drivingly connected to a main reduction gear of the intermediate shaft through a fourth planetary gear mechanism, wherein the fourth planetary gear mechanism comprises a fourth sun gear, at least one set of planetary gear, a fourth ring gear and a fourth planetary frame;

wherein one of the fourth sun gear, the fourth ring gear and the fourth planetary frame is fixed relative to the casing of the power system, the main reduction gear is drivingly connected to one of the unfixed members to provide power thereto, and the other unfixed member is drivingly connected to an input end of the differential to drive the differential.

10. The power system according to claim 5, wherein the first actuating cylinder controls the first clutch through a first release bearing, and the second actuating cylinder controls the second clutch through a second release bearing.

11. The power system according to claim 2, wherein the third sun gear is fixedly connected to a rear casing; the third ring gear is fixed to the second rotor of the second electric motor and rotates with the second rotor, and the second electric motor transmits power to the first input shaft through the third planetary frame.

* * * * *